US008716636B2

(12) United States Patent
Bollman et al.

(10) Patent No.: US 8,716,636 B2
(45) Date of Patent: May 6, 2014

(54) ARRANGEMENT AND METHOD FOR POWERING INDUCTORS FOR INDUCTION HARDENING (76) Inventors: John C. Bollman, Warren, MI (US); Richard J. Roth, Sterling Heights, MI (US)

(*) Notice: Subject to any disclaimer, the term of this patent is extended or adjusted under 35 U.S.C. 154(b) by 807 days.

(21) Appl. No.: 12/897,220

(22) Filed: Oct. 4, 2010

(65) Prior Publication Data

US 2011/0084063 A1   Apr. 14, 2011

Related U.S. Application Data (60) Provisional application No. 61/278,043, filed on Oct. 2, 2009.

(51) Int. Cl.
H05B 6/10 (2006.01)
H05B 6/04 (2006.01)
H05B 6/36 (2006.01)

(52) U.S. Cl.
USPC .......... 219/639; 219/635; 219/660; 219/672; 219/676

(58) Field of Classification Search
USPC ......... 219/632, 635, 639, 659, 661, 662, 670, 219/676, 677, 640, 642, 643, 672, 660
See application file for complete search history.

(56) References Cited

U.S. PATENT DOCUMENTS

| 1,376,984 | A | 5/1921 | Wandersee |
| 2,213,241 | A | 9/1940 | Denneen et al. |
| 2,255,103 | A | 9/1941 | Denneen et al. |
| 2,295,777 | A | 9/1942 | Denneen et al. |
| 2,481,008 | A | 9/1949 | Gagliardi et al. |
| 2,484,238 | A | 10/1949 | Molloy |
| 2,641,682 | A | 6/1953 | McKenna |
| 2,655,367 | A | 10/1953 | Andersen |
| 2,673,922 | A | 3/1954 | Edwards |
| 2,676,242 | A | 4/1954 | Witsenburg |
| 2,743,345 | A | 4/1956 | Seulen et al. |
| 2,756,315 | A | 7/1956 | Kelbow |
| 2,777,041 | A | 1/1957 | Dustman |
| 2,794,894 | A | 6/1957 | Tudbury |
| 3,174,738 | A | 3/1965 | Seulen et al. |
| 3,188,440 | A | 6/1965 | Wokas |
| 3,247,353 | A | 4/1966 | Cary |
| 3,300,614 | A | 1/1967 | Sorensen |
| 3,510,619 | A | 5/1970 | Leatherman |
| 3,619,540 | A | 11/1971 | Soworowski |
| 3,784,780 | A | 1/1974 | Laughlin et al. |
| 3,914,572 | A | 10/1975 | Jensen |
| 3,914,809 | A | 10/1975 | Ciampa et al. |
| 3,944,446 | A | 3/1976 | Bober |

(Continued)

FOREIGN PATENT DOCUMENTS

JP  2004-156088  6/2004
WO  90-14743 A1  11/1990

Primary Examiner — Tu B Hoang
Assistant Examiner — Hung D Nguyen
(74) Attorney, Agent, or Firm — John R. Benefiel (57) ABSTRACT An arrangement for induction hardening a part including a pair of separate inductors electrically isolated from each other and configured to substantially surround a part when brought into close juxtaposition with each other. The inductor sections are powered by respective secondary inductor loops brought into close juxtaposition with a primary inductor loop connected to an ac power source which induces an ac current in each inductor section.

12 Claims, 8 Drawing Sheets (56) References Cited

U.S. PATENT DOCUMENTS

| | | | |
|---|---|---|---|
| 3,967,089 A | 6/1976 | Seulen et al. | |
| 4,043,847 A | 8/1977 | Just | |
| 4,100,387 A | 7/1978 | Reinke et al. | |
| 4,123,644 A | 10/1978 | Sorensen | |
| 4,194,728 A | 3/1980 | Stengel et al. | |
| 4,271,345 A * | 6/1981 | Palmer et al. | 219/677 |
| 4,459,451 A | 7/1984 | Regele | |
| 4,604,510 A | 8/1986 | Laughlin et al. | |
| 4,618,125 A | 10/1986 | Balzer | |
| 4,675,488 A | 6/1987 | Mucha | |
| 4,714,809 A | 12/1987 | Hammond et al. | |
| 4,720,311 A | 1/1988 | Hutton et al. | |
| 4,728,761 A | 3/1988 | Mucha et al. | |
| 4,732,624 A | 3/1988 | Balzer | |
| 4,759,808 A | 7/1988 | Novorsky | |
| 4,867,810 A | 9/1989 | Novorsky | |
| 4,893,789 A | 1/1990 | Novorsky | |
| 5,157,231 A | 10/1992 | Baeuerle et al. | |
| 5,451,749 A | 9/1995 | Griebel et al. | |
| 5,495,094 A * | 2/1996 | Rowan et al. | 219/645 |
| 5,796,078 A | 8/1998 | Ottenwaelder et al. | |
| 6,069,348 A | 5/2000 | Roginski | |
| 6,140,625 A | 10/2000 | Gezarzick et al. | |
| 6,153,865 A | 11/2000 | Storm et al. | |
| 6,160,247 A | 12/2000 | Storm et al. | |
| 6,160,248 A | 12/2000 | Ottenwaelder et al. | |
| 6,259,076 B1 | 7/2001 | Gezarzick et al. | |
| 6,274,857 B1 | 8/2001 | Loveless et al. | |
| 6,362,462 B1 | 3/2002 | Merrell et al. | |
| 6,514,455 B1 | 2/2003 | Watanabe et al. | |
| 6,555,800 B1 | 4/2003 | Zahn | |
| 6,765,181 B1 | 7/2004 | Chatterjee et al. | |
| 7,291,817 B2 | 11/2007 | Weiss et al. | |
| 7,457,344 B2 * | 11/2008 | Fishman et al. | 373/150 |
| 2008/0114429 A1 * | 5/2008 | Nagano et al. | 219/674 |

* cited by examiner

ARRANGEMENT AND METHOD FOR POWERING INDUCTORS FOR INDUCTION HARDENING

CROSS REFERENCE TO RELATED APPLICATIONS

This application claims the benefit of U.S. provisional application No. 61/278,043 filed on Oct. 2, 2009, incorporated herein by reference.

BACKGROUND OF THE INVENTION

This invention concerns induction hardening which is widely used in industry to harden such parts as cam shafts, crank shafts, etc. In this process an inductor surrounds a section of the part, and a high frequency voltage is applied to the inductor. This induces a current in the surface of the part (to a variable depth set by design), rapidly heating the same to a desired temperature. A flow of quenching coolant is then directed at the part, thereby hardening the surface of the part to the hardness and depth desired.

In the conventional arrangement, the inductor (typically a single turn coil) is constructed in two halves in order to allow positioning of the part within the coil by a clam shell opening of the inductor closed around the part when the ends of each half are pivoted together. The coil halves can also be separated by linear motion and then brought together to surround the part. In this arrangement it is necessary to make an electrical connection between the inductor half coil ends in order to complete the circuit and cause current to flow through both coil halves.

Power from a high frequency power source is applied to the inductor to cause a high frequency current to flow through the connected inductor coil halves.

Such electrical connections must be made with care to insure a proper flow of power through the complete inductor coil, slowing the process of loading the part. Such connections are subject to wear and present a maintenance burden in this application. This requirement makes automation of part loading somewhat impractical.

Another problem often encountered is the formation of gaps in the electric field induced around the inductor which would create unevenness in the hardening obtained in the part, necessitating rotation of the part in the inductor coil in order to prevent this, complicating the equipment needed and slowing the completion of the hardening part heating cycle.

It is an object of the present invention to provide an arrangement and method of powering an inductor formed of two half coils which does not require the making and breaking of an electrical connection between the two inductor half coils.

It is a further object of the invention to provide such arrangement and method which does not create gaps in the electrical field created by the inductor coil to and thereby not require any rotation of the part during the induction hardening process.

SUMMARY OF THE INVENTION

The above recited objects and other objects which will be understood upon a reading of the following specification and claims are achieved by an inductive coupling in common simultaneously to both inductor coil half sections of a two part inductor coil allowing separation to position a part therein, inducing a high frequency voltage in each inductor coil half section, while not requiring a direct electrical connection between the inductor coil half sections. This is accomplished by applying the power to primary conductor loop which is positioned between respective secondary conductor loops connected to the respective inductor coil half sections below these half coil sections.

Thus, the necessity for an electrical connection between the inductor coil half sections is eliminated and the sections can be quickly moved apart and back again together for loading and unloading of the part or for shifting the part to bring another area of the part into the inductor coil. This feature facilitates automation of the process and allows simultaneous treatment of many or all of the areas of work pieces such as cam shafts and crank shafts by a plurality of inductor coils to greatly speed the cycle times.

In addition, it has been found that no gaps in the induced electrical currents result such that the part need not be rotated, further simplifying the equipment necessary.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
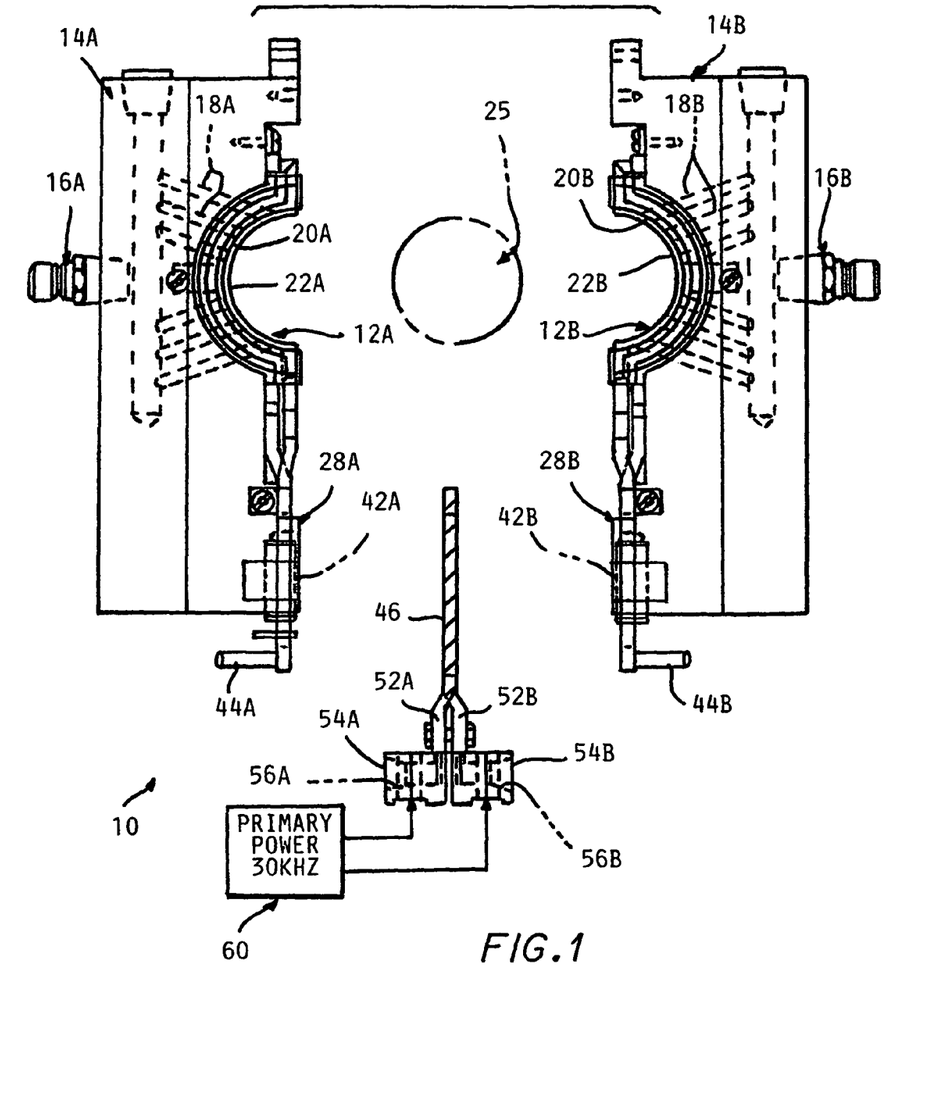
FIG. 1 is a partially exploded end view of an induction hardening arrangement with a diagrammatic depiction of a primary power source.

Referring to the drawings and in particular FIG. 1, an arrangement 10 according to the invention includes a pair of inductor half coils 12A, 12B, each held in recesses in a respective cooling block 14A, 14B in the manner well known in the art.

During use, coolant is directed under pressure into inlets 16A, 16B which passes into an array of radial internal passages 18A, 18B which open into the semicircular recesses 20A, 20B adjacent spaced apart partially circular segments 22A, 22B to quench the part 24 after induction heating to create a case in the well known manner. The inner coil sections 22A, 22B are spaced apart to allow the entrance of quenching coolant via passages 18A, 18B.

The inductor coil half sections 12A, 12B also include outer partially circular segments 24A, 24B more widely spaced apart to accommodate the passages 18A, 18B respectively.

Figure 2:
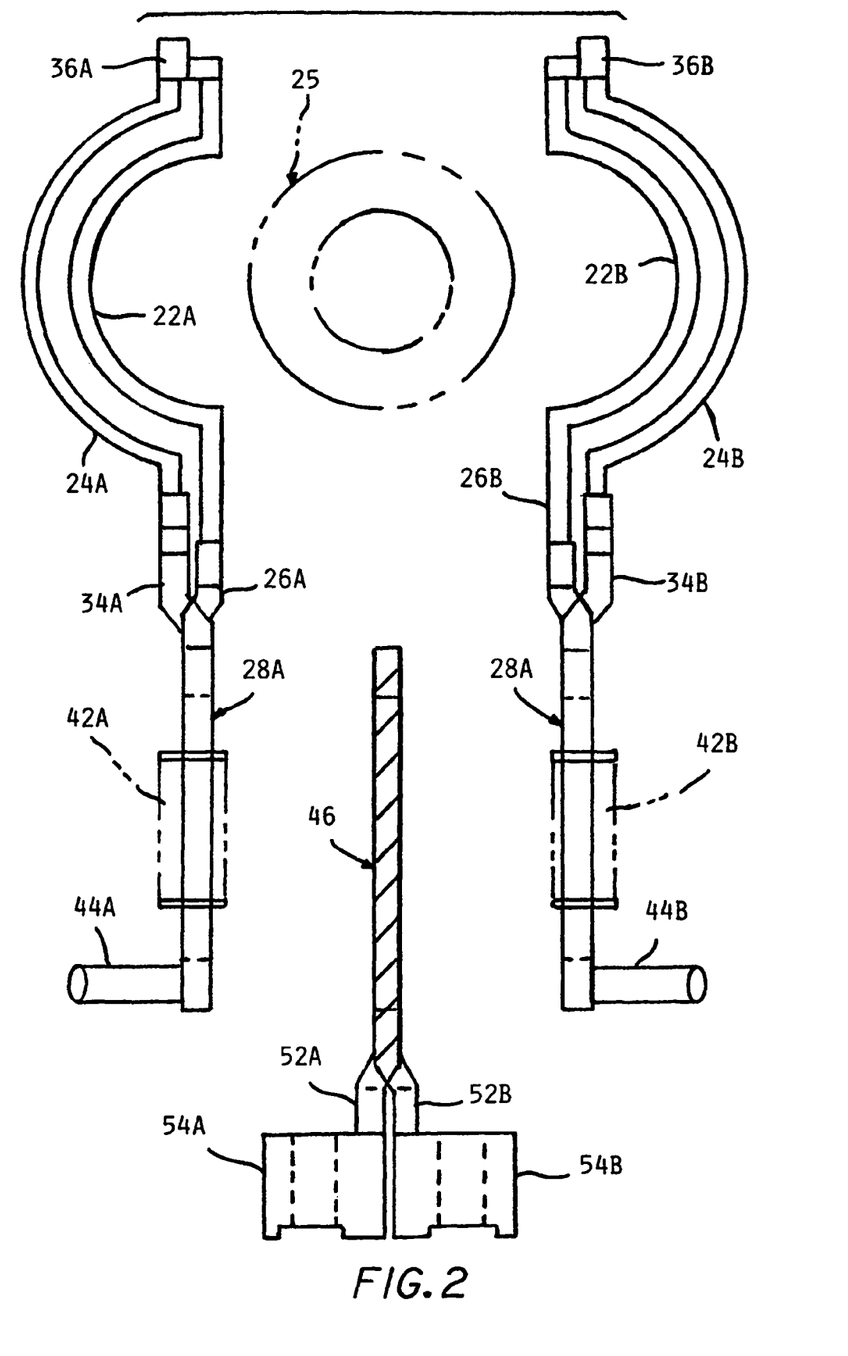
FIG. 2 is a side view of the arrangement shown in FIG. 1 in the operative position of the main components.
Figure 2A:
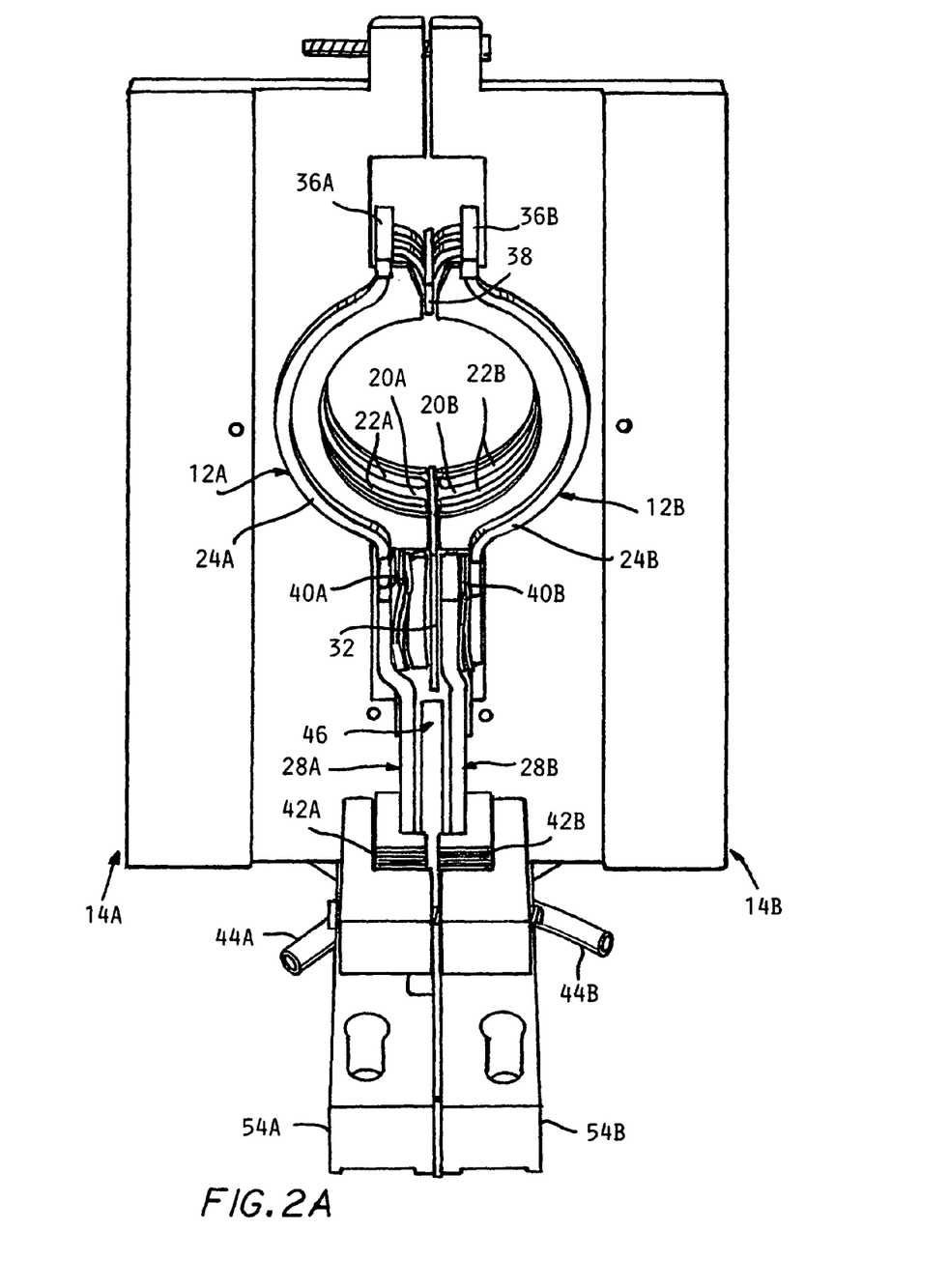
FIG. 2A is a pictorial end view of the components shown in FIG. 2.
Figure 3A:
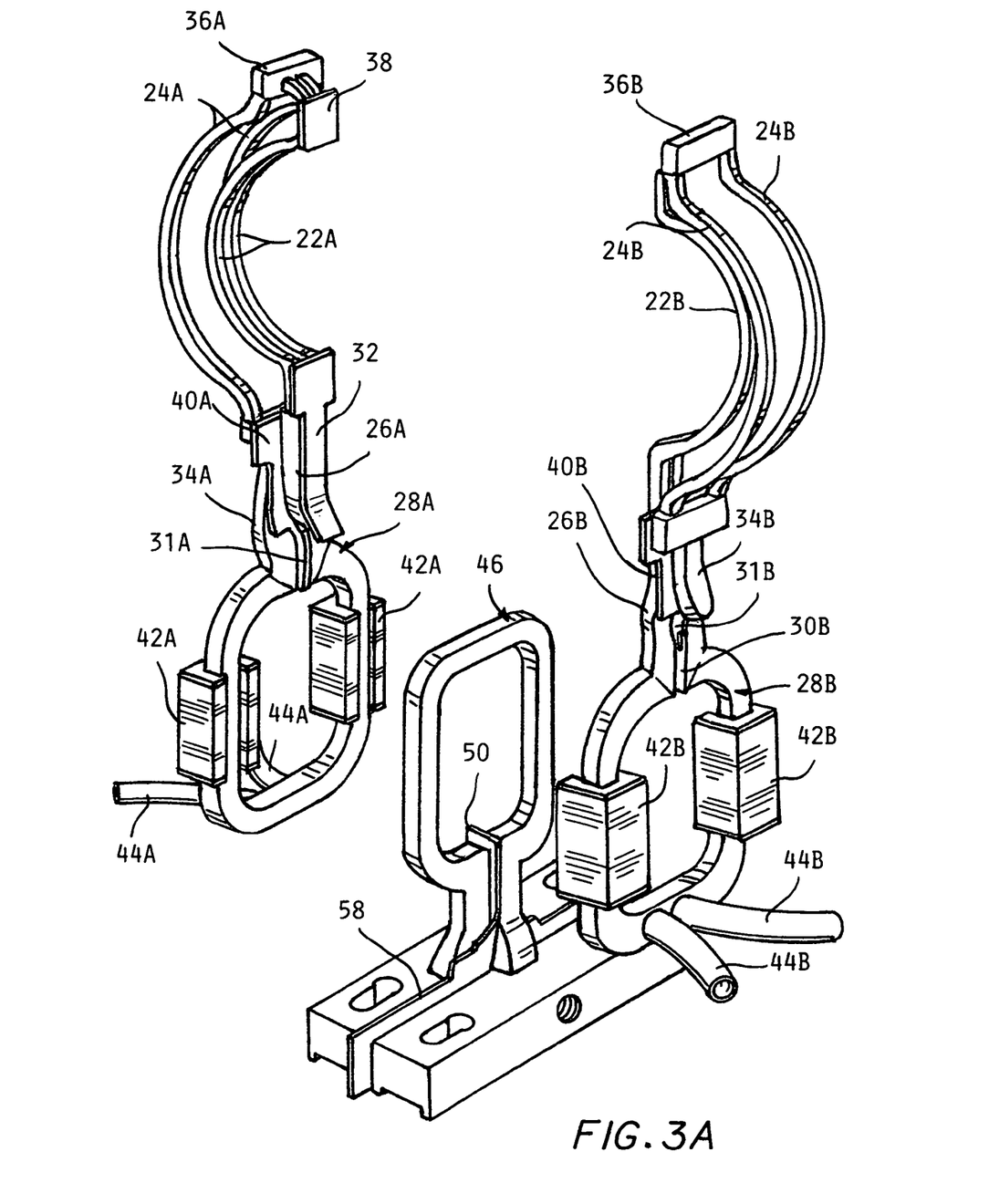
FIG. 3A is a separated view of the inductor coils and primary loop components included in the arrangement shown in FIG. 1.
Figure 3B:
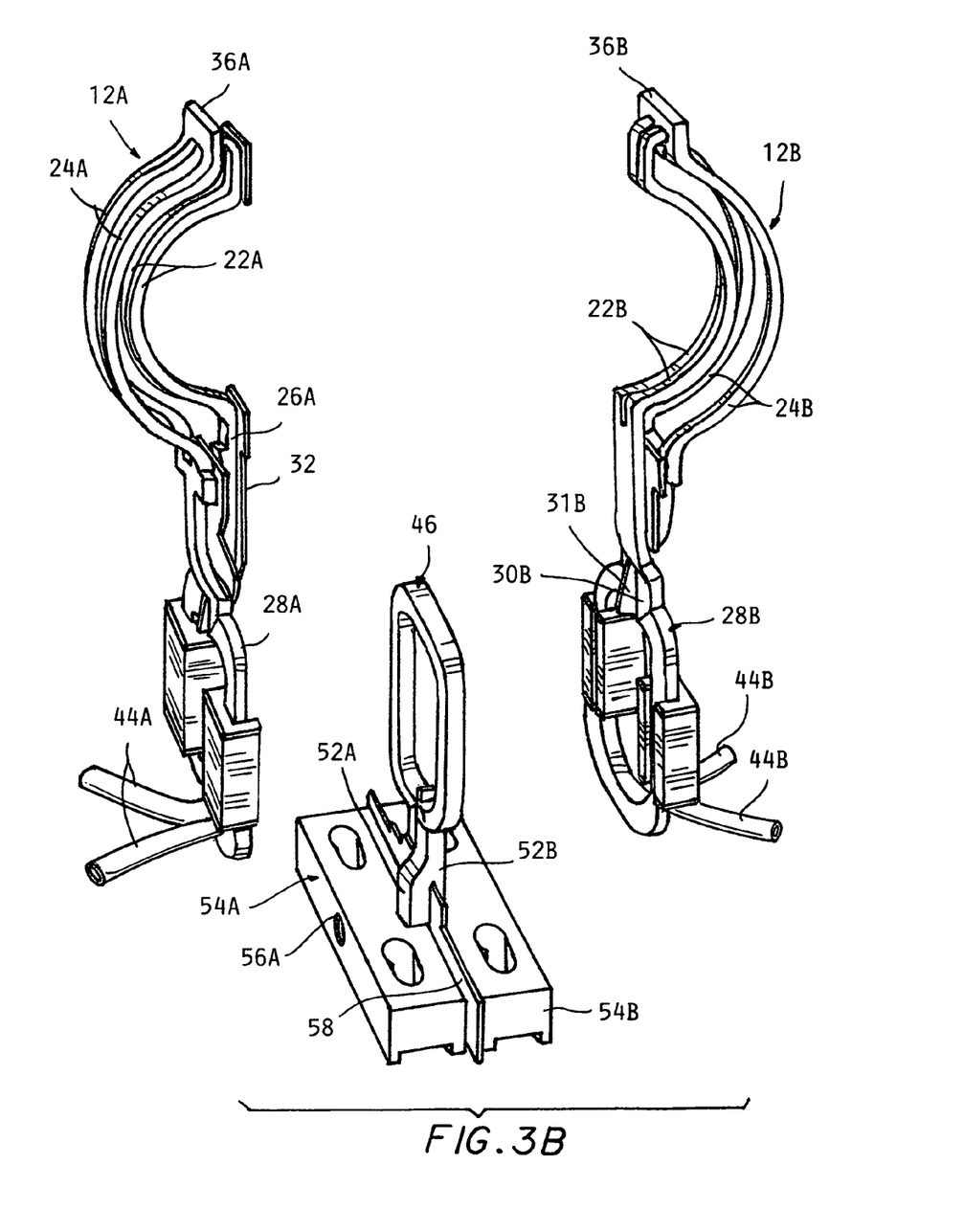
FIG. 3B is a pictorial view of the components shown in FIG. 3.
Figure 4:
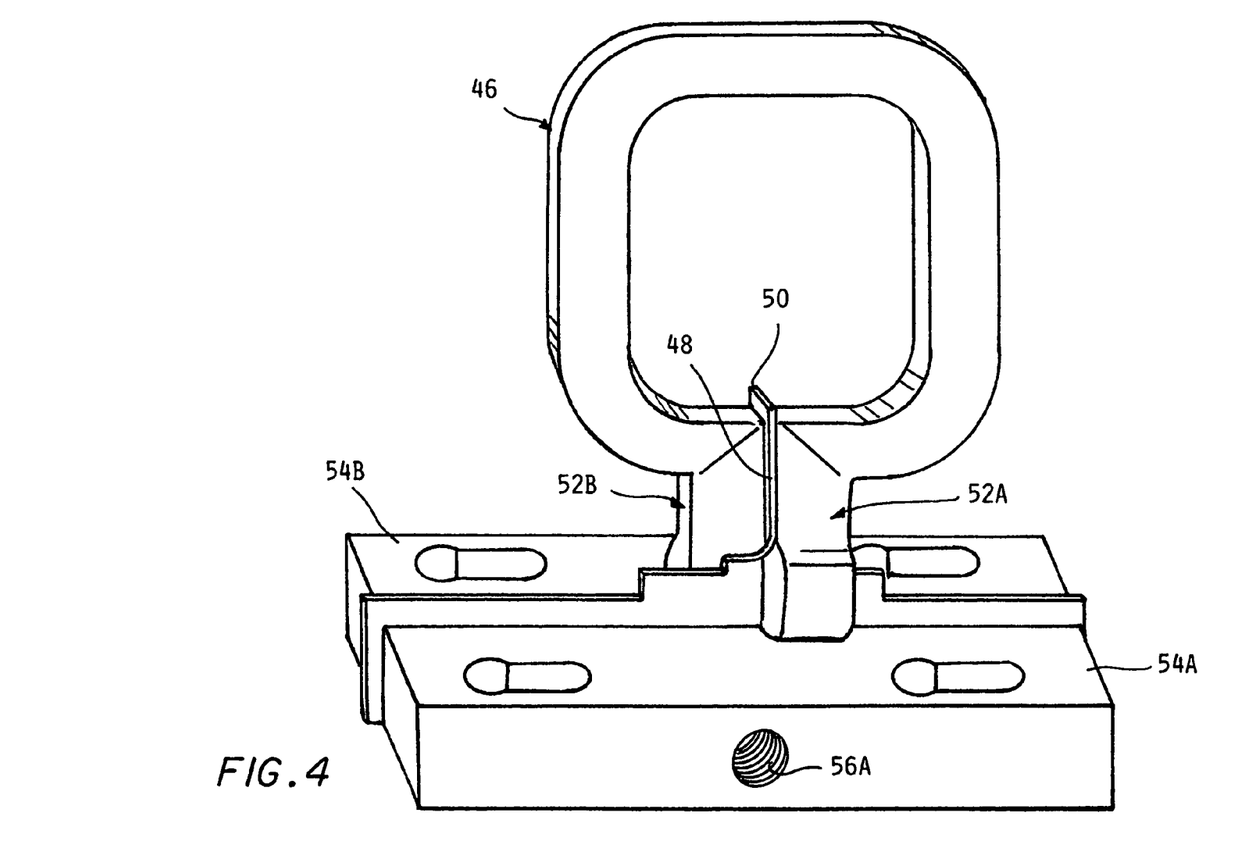
FIG. 4 is an enlarged pictorial view of the primary loop component shown in FIGS. 3 and 3A.
Figure 5:
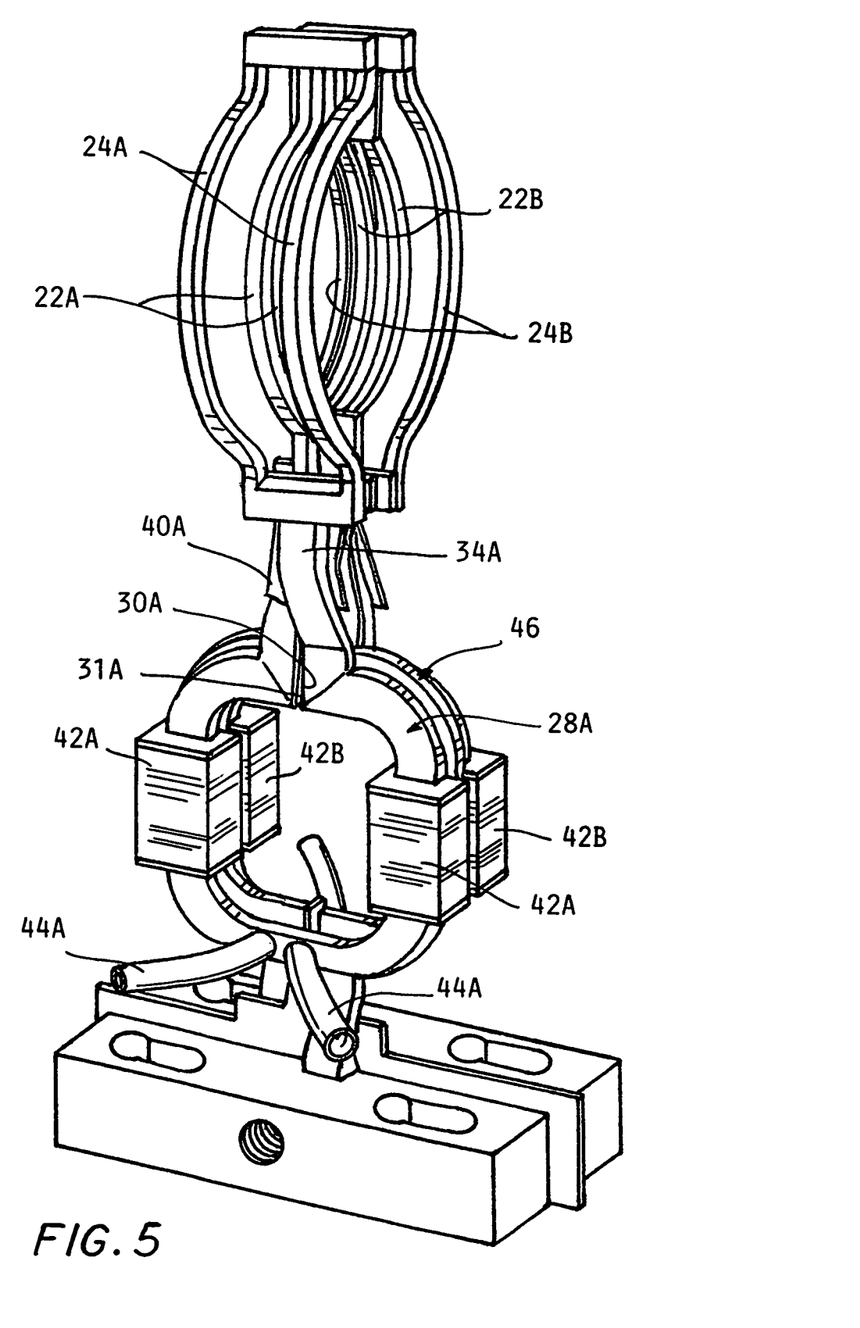
FIG. 5 is a side view of the components of FIGS. 3 and 3A in the position assumed during induction heating of a part.
Figure 6:
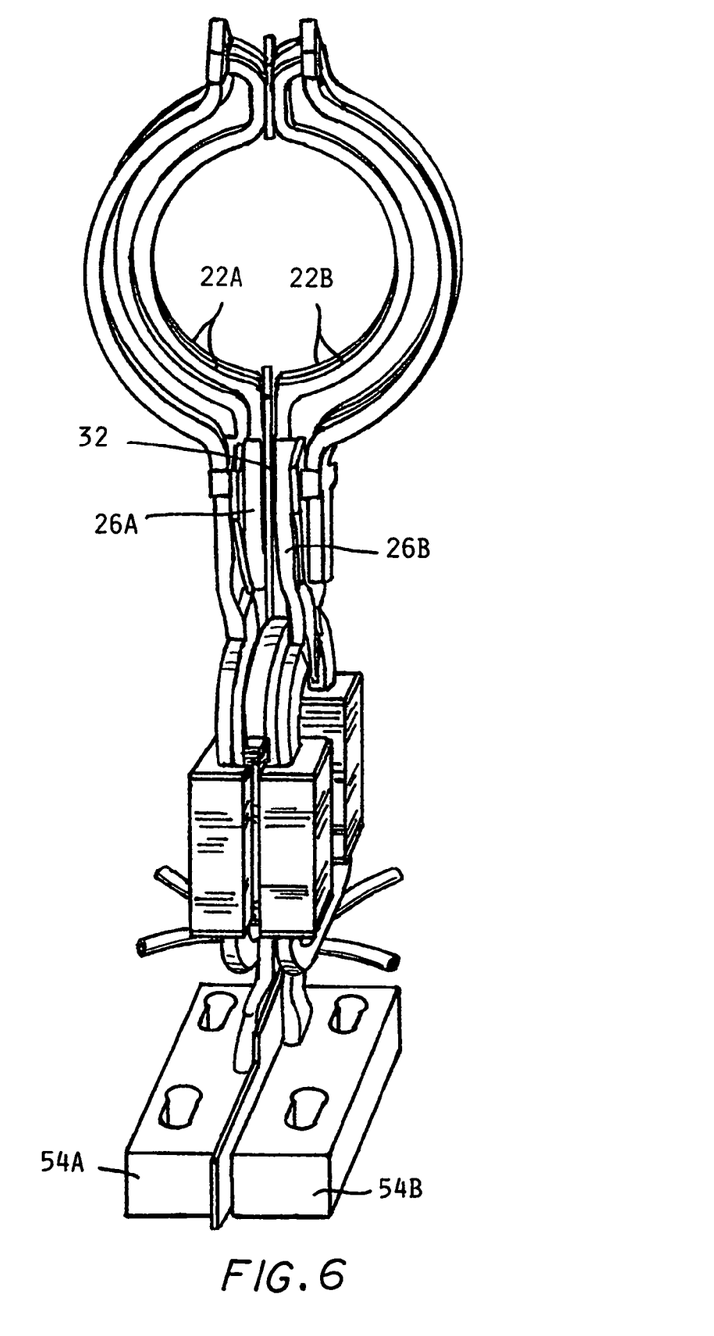
FIG. 6 is an end view of the components shown in FIG. 5.

The segments 22A, 22B are formed of copper and partially circularly shaped to encircle the part 25 when brought into a position next to each other as seen in FIG. 2A and 6. The configuration will vary to match any particular shape and area size of the part 25 as known in the art.

The lower ends of each of the segments 22A are integral with a conductive connector leg 26A, 26B descending to a connection with one side of a pair of generally square secondary inductor loops 28A, 28B which are split at 30A, 30B with insulator strips 31A, 31B inserted therein to preclude any electrical contact or arcing between the two ends thereof. An insulator strip 32 is also adhered to one leg 26A to insulate the two legs 26A, 26B when brought together during induction heating of a part 25.

The outer return segments 24A, 24B are connected at their lower ends to conductor legs 34A, 34B joined to the inductor loops 28A, 28B at the other side of splits 30A, 30B from the side connected to legs 26A, 26B.

The upper ends of segments 22A, 22B, 24A, 24B are connected together by joining pieces 36A, 36B, with in insulator strip 38 adhered to upper straight ends of the inner coil segments 22A to prevent any contact or arcing. Insulator strips 40A, 40B are interposed between legs 26A, 34A and 26B, 34B for the same purpose.

Each side of each inductor loop 28A, 28B has secured thereto a flux concentrator lamination 42A, 42B using a thin iron or FLUXTROL™ laminations of a thickness (such as 0.003 inches) suited to the particular part hardening application in the manner well known in the art.

Each secondary inductor loop 28A, 28B has coolant inlets and outlets 44A, 44B to allow circulation of coolant in hollows therein (not shown).

Both of the secondary inductor loops 28A, 28B are aligned with a single primary inductor loop 46 split at 48 with in interposed insulator strip 50. The primary loop 46 has an insulator coating (typically 0.015 to 0.020 inches thick) as of nylon applied in a dip process which is durable to withstand wear. Each side is integral with a connector leg 52A, 52B joined to a respective terminal bar 54A, 54B in turn connected to a primary AC power source 60 such as to apply 30 Khz thereto as shown diagrammatically.

The terminal bars 54A, 54B have coolant entry/exit ports 56A, 56B allowing circulation of coolant through passages in the terminal blocks 54A, 54B and loop 46. An insulator strip 58 interposed between the terminal blocks 54A, 54B to prevent contact or arcing.

Accordingly, a single primary loop inductively powers two electrically isolated coils without any electrical connection between the two coils. All that is required is that they be moved in to be immediately adjacent a respective side of the primary loop 46.

Additional turns could be provided of the primary loop 46, as necessary to achieve a desired power level but a one-to-one equal area of the primary loop 46 and secondary loops 28A, 28B has successfully been operated as described.

The two assemblies 12A, 12B can be mounted for linear in and out movement to capture a part section which allows axial movement of the part to locate a different area for hardening between the coil sections or pivoted to allow a clam shell opening motion. Multiple coil section units can be used to simultaneously harden multiple sections of a part simultaneously. Turn table arrangements can also be used to bring variously configured inductor section pairs together for different sections of the part.

It has been found that by inductively powering two electrically isolated coil halves y the arrangement shown, dead spots are avoided so that rotation of the part is not necessary.

The invention claimed is:

1. An inductor powering arrangement for inductively hardening the perimeter of a portion of a part; comprising a pair of separate electrically isolated aligned inductor coil sections mounted to be movable towards and away and each configured to form an open cavity facing the other inductor coil section to thereby together form an opening configured to substantially surround said portion of said part when moved towards each other and into a closed position into close juxtaposition, being closely spaced from each other but not creating any touching contact therewith;

each inductor coil section electrically connected to a respective separate secondary inductor loop located spaced therefrom by an electrical connector comprised of a rigid conductor connected to each inductor coil section and a respective associated secondary inductor loop to form an electrical and mechanical connection therebetween; said respective secondary inductor loops each mounted to be substantially aligned with each other and movable towards and away from each other by said movements of said connected inductor coil sections towards and away from each other;

an AC power source;

a common primary loop connected to said AC power source and mounted to be interposed in between and substantially aligned with said secondary inductor loops, so that said secondary inductor loops are moved to be immediately adjacent to said common primary loop while not making direct contact therewith when said inductor coil sections are moved towards each other, whereby said separate inductor coil sections are separately powered by induction between said common primary loop and said secondary inductor loops and said electrical connectors between each of said inductor coil sections and said secondary inductor loop such that said part can be positioned between said inductor coil section cavities by movement apart and then enclosed when said separate inductor coil sections are moved together and said inductor coil sections are thereby simultaneously caused to be powered by said AC power source when said movement together is completed, and power to said inductor coils simultaneously discontinued upon movement of said induction coil sections apart from each other and from said common primary loop to no longer induce electric current in said secondary loop from said AC power source.

2. The inductor powering arrangement according to claim 1 wherein said separate secondary inductor loops and said interposed common primary loop are each of substantially equal facing areas.

3. The inductor power arrangement according to claim 2 wherein each of said secondary inductor loops and said common primary loop have a single square turn.

4. The inductor power arrangement according to claim 1 wherein said common primary loop is coated with an electrically insulative material.

5. The inductor powering arrangement according to claim 1 wherein said common primary loop has two input legs each connected to a respective bus bar terminal connected to said AC power source.

6. The inductor powering arrangement according to claim 1 further including insulative strips between said connector legs and opposing portions of said separate inductor sections with said inductor sections in close juxtaposition.

7. The inductor powering arrangement according to claim 1 wherein each of said secondary inductor loops has a laminate flux concentrator on each side thereof.

8. A method of controlling the powering of a pair of aligned separate electrically isolated inductor coil sections, comprising configuring each inductor coil section with an open cavity which together form an opening configured to substantially surround a part for induction hardening thereof when said inductor coil sections are brought together into close juxtaposition, connecting a respective one of a pair of secondary induction loops to one of said inductor coil sections to be electrically connected and to move together therewith with an associated inductor coil sections so as to at the same time bring each secondary induction loop into close juxtaposition with a common primary loop connected to an AC power source and interposed between said secondary induction loops upon bringing said inductor coil sections together to surround said part to thereby simultaneously cause powering of said inductor coil sections by the close proximity of said secondary induction loops to said common primary loop and simultaneously discontinuing powering of said inductor coil sections by moving said induction coil sections apart when loading a part to at the same time move said secondary induction loops away from said common primary loop to discontinue powering said secondary loops by said AC source and said common primary loop to thereby simultaneously discontinue powering of said inductor coil sections.

9. The method according to claim 8 further including making facing areas of said secondary induction loops and said common primary loop substantially equal to each other.

10. The method according to claim 9 including making said common primary loop and said secondary induction loops flat single turn loops of approximately equal areas.

11. The method according to claim 8 including connecting each inductor coil section to a pair of conductive legs each connected to a side of a respective secondary inductor loop.

12. The method according to claim 11 including mounting a pair of flux concentrators to respective opposite sides of each of said secondary induction loops.

* * * * *